United States Patent Office 2,990,881
Patented July 4, 1961

2,990,881
TREATING PERMEABLE UNDERGROUND FORMATIONS
Charles C. Nathan and Reeves B. Perry, Bellaire, Tex., assignors to Texaco Inc., a corporation of Delaware
No Drawing. Filed Dec. 3, 1957, Ser. No. 700,274
14 Claims. (Cl. 166—38)

This invention relates to the treatment of permeable underground formations. More particularly, this invention relates to a method of treating permeable underground formations to reduce the porosity thereof. In accordance with one embodiment this invention is directed to the treatment of permeable underground formations to substantially completely plug these formations. In accordance with yet another embodiment this invention is directed to a method of treating permeable underground formations to reduce the porosity and the permeability of such formation, particularly water permeability. In accordance with yet another embodiment this invention is directed to a method of treating permeable underground formations to increase the relative oil-water permeability thereof.

It is known to treat permeable underground formations to render the same substantially impermeable. One practice employed heretofore has been to inject liquid cement into permeable formations, and then to permit the cement to set therein. A formation so treated is rendered substantially fluid impermeable. Another method practiced heretofore has been to inject into an underground permeable formation one treating solution followed by another treating solution, and permitting the thus-introduced treating solutions to react with each other within the formation with the eventual formation and deposition of solid materials, thereby plugging the thus-treated formation. Still another method employed heretofore has involved the injection of a treating solution into an underground permeable formation and permitting the thus-introduced treating solution to react with the formation fluids with the eventual formation and deposition of solid materials.

Each of the foregoing methods of plugging or reducing the permeability of underground formations has some disadvantage. For example, it is difficult to inject liquid cement into relatively tight, low permeability formations. Further, cement plugging is sometimes difficult to control. The use of two treating solutions to plug a formation is not usually completely satisfactory due to a skin-plugging effect predominant at the interface of the treating solutions within the formation. Further, when two treating solutions are employed an intimate admixture to insure a satisfactory and complete reaction of both treating solutions within the formation undergoing treatment is difficult to obtain.

Accordingly it is an object of this invention to provide an improved method for treating permeable underground formations to reduce the porosity thereof.

Still another object of this invention is to provide a method whereby a single, homogeneous treating solution is employed to plug or to effect at least a partial reduction in the porosity of an underground formation.

Still another object of this invention is to provide a plugging method or a method for reducing the porosity of permeable formations wherein there is caused to be deposited within the pores or interstices of the formation undergoing treatment a preferentially oil-wettable solid.

How these and other objects of this invention are accomplished will become apparent with reference to the accompanying disclosure. In at least one embodiment of the practice of this invention at least one of the foregoing objects will be obtained.

We have now discovered that an improved method of treating a permeable underground formation to reduce the porosity of the same is obtained by introducing into said formation a solution of a metal compound, the sulfide of which metal is water insoluble, and a thioamide. The thioamide hydrolyzes in situ when introduced into the thus-treated formation to yield hydrogen sulfide which reacts with the metal compound also present dissolved in the treating solution to form the water insoluble metal sulfide. The thus-formed water insoluble metal sulfide is precipitated and is deposited in situ within the formation undergoing treatment.

A single, homogeneous solution containing a metal compound and a thioamide is employed in the practice of this invention. Since but a single treating solution is employed the formation undergoing treatment can readily be substantially completely saturated or permeated with the treating solution to any desired extent.

Desirably the treating solution in accordance with the practice of this invention is an aqueous solution containing a water soluble metal compound the sulfide of which metal is water insoluble. Similarly the thioamide employed in the practice of this invention is desirably one which is soluble in aqueous solutions.

Metal compounds, the sulfides of which metal are water insoluble, which are suitable for use in the practice of this invention include the water soluble compounds and salts of the heavy metals, such as lead, mercury, copper, bismuth, cadmium, germanium, silver, iron, nickel, molybdenum, manganese, chromium, vanadium, zinc as well as arsenic and antimony, and mixtures thereof. Particularly useful in the practice of this invention are the lead acetates, lead chlorate, lead nitrate, lead dithionate, basic lead nitrate, lead perchlorate, lead phosphate, mercuric chlorate, mercuric nitrate, mercurous chloride, copper sulfate, ferric nitrate, ferric chloride, ferric sulfate, chromium sulfate, zinc sulfate, zinc nitrate, silver nitrate, silver sulfate, antimonium nitrate, tin nitrate, nickel nitrate, nickel chloride and the like. In general, as indicated hereinabove, any of the water soluble salts of the aforementioned metals are suitably employed in the practice of this invention. The aforementioned metals all form water insoluble sulfides. These water insoluble sulfides which are generated in situ in accordance with the practice of this invention to effect a reduction of the porosity of the thus-treated formation include PbS, HgS, $Cu_2S$, CuS, $Bi_2S_3$, CdS, GeS, $As_2S_3$, $SbS_2$, SnS, $Ag_2S$, $FeS_2$, FeS, $Fe_2S_3$, NiS, $MoS_2$, MnS, $MnS_2$, ZnS, CrS, $Cr_2S_3$, $V_2S_3$ and others.

The thioamide employed in the practice of this invention is a thioamide which is soluble in aqueous solutions. Generally a thioamide having the formula

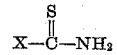

wherein X is a radical selected from the group consisting of a hydrogen radical and a hydrocarbyl radical, a hydrocarbyl radical being a radical which contains only carbon and hydrogen atoms, is suitable in the practice of this invention. It is preferred that X be an alkyl radical (R) such as an alkyl radical containing from 1 to 7, inclusive, carbon atoms. Particularly useful in the practice of this invention are the following thioamides: thioformamide, thioacetamide and thiopropionamide.

The practice of this invention is particularly applicable to the plugging of underground, permeable water-producing or water-containing formations. Such formations by employing the practice of this invention can be substantially completely plugged, i.e., rendered water impermeable, or can have their water permeability substantially reduced. The practice of this invention is also applicable to the treatment of underground, permeable, petroleum-producing or containing formations to reduce the porosity thereof and to alter or even increase the oil permeability thereof.

In accordance with one feature of the practice of this invention it is pointed out that since the heavy metal sulfides disclosed herein and which are precipitated in situ within the formation are for the most part preferentially oil-wettable, i.e., hydrophobic, not only is the porosity of the thus-treated formation reduced, along with a reduction in the water permeability of such formations, but also it is possible to effect an increase in the oil permeability, particularly the relative oil-water permeability, of the formations since at least a portion of the interstices of a formation treated in accordance with this invention will now be occupied by the precipitated, preferentially oil-wettable metal sulfide particles. Should, however, it be desirable to plug completely a permeable formation a sufficient amount and/or concentration of metal sulfide is caused to be deposited within the pores of the formation to substantially completely occupy the pores.

The following examples are illustrative of the practice of this invention. A sand pack of white blasting sand was prepared in a permeameter test cell and saturated with 5% sodium chloride brine solution. A treating solution in accordance with this invention containing lead acetate and thioacetamide was then introduced into the sand pack. The treating solution in this instance was acidified with nitric acid to prevent the lead acetate from hydrolyzing with the resultant precipitation of solid lead hydroxide. After a period of time the permeability of the sand pack was measured and it was found that the water permeability of the treated sand pack was substantially reduced due to the deposition within the interstices of the sand pack of lead sulfide brought about by the hydrolysis of thioacetamide within the sand pack to yield hydrogen sulfide which in turn reacted with the lead acetate in solution therein to yield the water insoluble lead sulfide. The data observed in carrying out the foregoing tests are set forth in accompanying Table I.

*Table I*

| | |
|---|---|
| Cell length | 37.5 cm. |
| Cell diameter | 31 cm. |
| Bulk volume | 283 ml. |
| Pore volume | 100 ml. |
| Porosity | 35.3%. |
| Water permeability | 8.81 darcys. |
| Composition of treating solution | 0.8 molar lead acetate. 0.8 molar thioacetamide. 4 normal nitric acid. |
| Volume injected | 40 ml. |
| Percent pore volume injected | 40%. |
| Reaction temperature | 25° C. |
| Permeability after reaction | 1.5 darcys. |
| Reduction in permeability | 83%. |

In another example illustrative of the practice of this invention sand packs were prepared with white blasting sand in permeameter cells and after evacuation and saturation with a 5% NaCl brine solution, were treated with an aqueous solution containing lead acetate and thioacetamide, the solution being acidified with acetic acid. The thus-treated packs after a suitable length of time were subsequently tested for water permeability and it was observed that the water permeability of the treated packs was substantially reduced. The data observed in the foregoing tests are set forth in accompanying Table II.

*Table II*

| | Sand Pack #7 (White Sand) | Sand Pack #8 (White Sand) |
|---|---|---|
| Cell length (cm.) | 37 | 34.5 |
| Cell diameter (cm.) | 3.1 | 3.1 |
| Bulk volume (ml.) | 281 | 262 |
| Pore volume (ml.) | 111 | 97.5 |
| Porosity (Percent) | 39.5 | 37.3 |
| Water permeability (darcys) | 9.8 | 10.3 |
| Composition of solution: | | |
| Molarity of lead acetate | 0.40 | 0.40 |
| Molarity of thioacetamide | 0.67 | 0.67 |
| Volume injected (ml.) | 82 | 76 |
| Percent Pore volume injected | 74 | 78 |
| Reaction time (hrs.) | 114 | 114 |
| Reaction temperature (° F.) | 140 | 78 |
| Permeability after reaction (darcys) | 7.0 | 7.9 |
| Percent Change in permeability | −28.6 | −23.3 |

The efficacy of a treating solution in accordance with the practice of this invention to reduce the porosity and to plug a permeable formation is amply illustrated by the accompanying data set forth in Tables I and II. It is mentioned that the rate of hydrolysis of the thioamide in the treating solution varies with temperature. Accordingly, if the temperature of the treating solution increases the rate of hydrolysis of the thioamide therein increases so that at higher treatment temperatures hydrogen sulfide is formed faster and plugging or change in the porosity of the formation undergoing treatment is accomplished in a shorter time. The reaction time required to effect the desired treatment depends upon the formation involved and the results sought. Usually a reaction time of at least 24 hrs., more or less, is desirable, such as a reaction time in the range 1–7 days.

Further, it is preferred in the practice of this invention to admix or to prepare the treating solution at the well head of the well bore in communication with the permeable underground formation to be treated. Also, any suitable amount of treating solution might be prepared depending upon the results desired. For example, an amount of treating solution in the range 25–50,000 barrels, more or less, might be prepared depending upon the porosity of the formation and the extent the formation is to be treated, e.g., whether the formation is to be treated up to 5 or 100 radial feet, more or less, from the well bore. Generally it is desirable in the practice of this invention, particularly when it is sought to plug a permeable water-producing formation, to first shut down the well for a period of time, e.g., a few days (1–7 days), in order to attain equilibrium conditions and then to introduce into the water-producing formation a sufficient amount of treating solution to effect a reduction in water permeability thereof or to completely plug the same.

Treating solutions prepared in accordance with this invention may have varying strengths depending upon the formation being treated and the extent of porosity reduction desired. Generally an amount of water soluble heavy metal compound and a thioamide in the range 1–200 lbs. per barrel (42 gal.) of treating solution, more or less, not necessarily equal amounts by weight is suitable.

As will be apparent to those skilled in the art many modifications, substitutions and alterations are possible in the practice of this invention without departing from the spirit or scope thereof.

We claim:

1. A method of treating a permeable underground formation to reduce the porosity thereof which comprises introducing into said formation an aqueous solution comprising a metal compound, the sulfide of which metal is water insoluble, and a thioamide, retaining the thus introduced solution within said formation in contact therewith hydrolyzing the thus-injected thioamide in said solution to form hydrogen sulfide whereby the metal sulfide of said metal is formed and precipitated in situ within said formation.

2. A method in accordance with claim 1 wherein said thioamide is thioformamide.

3. A method in accordance with claim 1 wherein said thioamide is thioacetamide.

4. A method in accordance with claim 1 wherein said thioamide is thiopropionamide.

5. A method in accordance with claim 1 wherein said thioamide has the formula $$X-\overset{\overset{S}{\|}}{C}-NH_2$$

wherein X is a radical selected from the group consisting of a hydrogen radical and a hydrocarbyl radical.

6. A method in accordance with claim 5 wherein X is an alkyl radical.

7. A method in accordance with claim 1 wherein said metal compound is a compound of a metal selected from the group consisting of lead, zinc, copper, iron and nickel.

8. A method in accordance with claim 1 wherein said metal compound is a water soluble lead compound.

9. A method in accordance with claim 8 wherein said water soluble lead compound is lead acetate.

10. A method in accordance with claim 8 wherein said water soluble lead compound is lead nitrate.

11. A method in accordance with claim 7 wherein said water soluble lead compound is basic lead nitrate.

12. A method in accordance with claim 1 wherein said metal compound is lead acetate and wherein said thioamide is thioacetamide.

13. A method in accordance with claim 1 wherein said metal compound is a water soluble copper salt and wherein said thioamide is thioacetamide.

14. A method of reducing the porosity of a permeable underground formation which comprises preparing at the well head an aqueous solution containing thioacetamide and lead acetate dissolved therein, substantially immediately thereafter introducing said solution into said formation, retaining the thus introduced solution within said formation in contact therewith thereby causing the thioacetamide in the thus-introduced aqueous solution to hydrolyze therein within said formation to yield hydrogen sulfide so that the thus-produced hydrogen sulfide reacts with the lead acetate in said solution to precipitate therefrom with the thus-treated formation solid lead sulfide, thereby reducing the porosity of the thus-treated formation.

References Cited in the file of this patent
UNITED STATES PATENTS

| | | |
|---|---|---|
| 1,897,843 | Hickman | Feb. 14, 1933 |
| 2,156,219 | Dunn | Apr. 25, 1939 |
| 2,808,886 | Bail et al. | Oct. 8, 1957 |